Patented Jan. 12, 1937

2,067,310

UNITED STATES PATENT OFFICE 2,067,310

CELLULOSE ESTER COMPOSITIONS, PARTICULARLY FOR MOLDING PURPOSES

Harold Allden Auden, Banstead, Hanns Peter Staudinger, Great Burgh, Epsom, and Philip Eaglesfield, Carshalton, England No Drawing. Application April 25, 1935, Serial No. 18,260. In Great Britain May 9, 1934

10 Claims. (Cl. 106—40)

This invention relates to cellulose ester compositions particularly for the making of molded articles, and has for its chief object the provision of an improved composition of the cellulose ester type.

According to the present invention the composition comprises cellulose triacetate and a substantial amount of a lactide or an anhydride of an organic acid having a boiling point of at least about 200° C. at normal pressure. Suitable proportions are those represented by incorporating into the triacetate an amount of lactide or anhydride equal to from 5 to 20 per cent. of the total composition. In the composition there may also be embodied any suitable known filler and/or plasticizer. Any known solvent (e. g. methylene chloride) may be employed for mixing purposes.

A suitable lactide is that obtained from fermentation lactic acid, and suitable anhydrides are those of maleic acid, succinic acid, and phthalic acid.

The following three examples are typical of compositions according to the present invention:—

Example 1

|   | Parts |
|---|---|
| Powdered cellulose triacetate | 100 |
| Lactide of fermentation lactic acid | 15 |
| Methylene chloride (as solvent) | 25 |
| Plasticizers { Triacetin | 12 |
| Ethylacetanilide | 5 |

Example 2

|   | Parts |
|---|---|
| Powdered cellulose triacetate | 100 |
| Maleic anhydride | 18 |
| Mixture of equal parts of methylene chloride and ethylene chlorhydrin (as solvent) | 25 |
| p-Toluene sulphanilide (as plasticizer) | 6 |

Example 3

|   | Parts |
|---|---|
| Powdered cellulose triacetate | 100 |
| Succinic anhydride | 20 |
| Methylene chloride (as solvent) | 60 |
| Celliton red dyestuff | 0.3 |

The cellulose triacetate may be of the precipitated type or the fibrous type and may first be mixed mechanically with the lactide or anhydride by any known means. After a thorough mechanical mixing has taken place, the solvent may be added and the whole worked up into a homogeneous mass to which is then added dyestuff, if desired, also a filler or a plasticizer such as those mentioned in the above examples, or others such as tricresyl phosphate, or triamyl citrate.

Among the advantages of compositions such as above described when used in the making of molded articles may be mentioned particularly the ability to employ satisfactorily molding temperatures as low as 120° C. to 180° C. instead of the usual temperature of about 200° C. and molding pressures of about 2000 to 3000 pounds per square inch instead of the usual pressure of about 5000 pounds per square inch, but of course the present invention is not limited to the use of such unusually low temperatures and pressures.

What we claim is:—

1. The process of producing a cellulose ester composition consisting in mixing as essential components cellulose triacetate and a material taken from the group consisting of lactides and the anhydrides of maleic, succinic and phthalic acids having a boiling point of at least 200° centigrade at normal pressure, first mechanically and then with the aid of a solvent.

2. The process of producing a cellulose ester composition consisting in mixing as essential components cellulose triacetate and the anhydride of maleic acid first mechanically and then with the aid of a solvent.

3. The process of producing a cellulose ester composition consisting in mixing as essential components cellulose triacetate and the anhydride of succinic acid first mechanically and then with the aid of a solvent.

4. The process of producing a cellulose ester composition consisting in mixing as essential components cellulose triacetate and the lactide of fermentation lactic acid first mechanically and then with the aid of a solvent.

5. The process of producing a cellulose ester composition consisting in mixing as essential components cellulose triacetate to the extent of from 95 to 80 per cent. with respectively from 5 to 20 per cent. of a material taken from the group consisting of lactides and the anhydrides of maleic, succinic and phthalic acids having a boiling point of at least 200° centigrade at normal pressure.

6. A composition suitable for molding comprising essentially cellulose triacetate and a material taken from the group consisting of lactides and the anhydrides of maleic, succinic and phthalic acids having a boiling point of at least 200° centigrade at normal pressure.

7. A composition suitable for molding comprising essentially cellulose triacetate and the lactide of fermentation lactic acid.

8. A composition suitable for molding comprising essentially cellulose triacetate and maleic anhydride.

9. A composition suitable for molding comprising essentially cellulose triacetate and succinic anhydride.

10. As a new article of manufacture a molded composition comprising essentially an intimate admixture of cellulose triacetate, a filler, and a material taken from the group consisting of lactides and the anhydrides of maleic, succinic and phthalic acids having a boiling point of at least 200° centigrade at normal pressure.

HAROLD ALLDEN AUDEN.
HANNS PETER STAUDINGER.
PHILIP EAGLESFIELD.